No. 780,892. PATENTED JAN. 24, 1905.
T. G. KNIGHT.
CREDIT BOOK.
APPLICATION FILED DEC. 30, 1903.

2 SHEETS—SHEET 1.

WITNESSES:

INVENTOR
Thomas G. Knight
BY
ATTORNEYS

No. 780,892. PATENTED JAN. 24, 1905.
T. G. KNIGHT.
CREDIT BOOK.
APPLICATION FILED DEC. 30, 1903.

2 SHEETS—SHEET 2.

*Fig. 3*

General Business Record of    No. 711

J. P. Doe — Hardware
62 Blank St
Blank City

Established since 1888 Capitol $35000.
Failed Jan. 15, 1893. Settled 50¢ on dollar July 1, '93.
Reopened Aug. 1, 1893. with M. Moe as Special
Partner to the extent of $40000. — Credit good
Extensive trade with West Indies.
Endorsed to the amount of $1000 monthly
by D. Loe & Co. — Statement Jan. 1, 1904 that
he is owner of brownstone house #647 & 471 — St.
Value $18000.
Bradstreets $4000    our limit $2500
Dunns    $3500    30 days
International $4500

WITNESSES:
J. A. Brophy
Geo. Hostetz

INVENTOR
Thomas G. Knight
BY 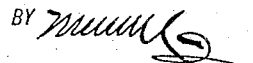
ATTORNEYS

No. 780,892. Patented January 24, 1905.

UNITED STATES PATENT OFFICE.

THOMAS G. KNIGHT, OF NEW YORK, N. Y.

CREDIT-BOOK.

SPECIFICATION forming part of Letters Patent No. 780,892, dated January 24, 1905.

Application filed December 30, 1903. Serial No. 187,180.

*To all whom it may concern:*

Be it known that I, THOMAS G. KNIGHT, a citizen of the United States, and a resident of the city of New York, borough of Brooklyn, in the county of Kings and State of New York, have invented a new and Improved Credit-Book, of which the following is a full, clear, and exact description.

The invention relates to blank books for the use of business-houses; and its object is to provide a new and improved credit-book arranged to contain credit information normally hidden from view, but readily accessible to the user of the book.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all of the views.

Figure 1 is a face view of the improvement. Fig. 2 is a cross-section of the same on the line 2 2 of Fig. 1, and Fig. 3 is a face view of the card containing the business record of a customer.

The leaves A of the credit-book are ruled to form a name-column B for containing the names of the customers of the firm or business-house, and adjacent to the name-column B is arranged a numeral-column C for containing a numeral opposite each of the customers' names, each numeral referring to the number of a card held in the drawer of a cabinet, the card containing a statement of the whole business record of the customer, (see Fig. 3,) the cabinet and drawer being preferably of the construction shown in the Letters Patent of the United States, No. 573,665, granted to me December 22, 1895. On each leaf A is also ruled a rating or credit column D, having two parts, in one of which is written the amount of credit or rating given the corresponding customer mentioned in the name-column B by the several mercantile agencies and in the other part of the credit-column is written the amount of credit given to the customer by the business-house or owner of the credit-book. This credit-column D is normally covered up by a cover E (see left-hand page, Fig. 1 or Fig. 2) to hide all the information contained in the credit-column, so that a customer when in the presence of the keeper of the book and seeing his name in the credit-column D cannot see the amount of credit given him by the business-house; but whenever the party in charge of the book or other authorized person wants to find the amount of credit to which the customer is entitled then it is only necessary to swing the cover E open (see right-hand page, Fig. 1) to obtain the desired information opposite the name of the customer in the credit-column D.

It is understood that by the aid of the rating given by the several mercantile agencies to a customer and the experience the business-house has had with this customer the credit-man of the business-house can readily figure out the amount of credit he is willing to give to the customer, and this amount is placed in the credit-column, as above described, so that the credit-column not only gives the rating of the mercantile agencies, but also the maximum amount of credit the business-house is willing to give to the customer. Thus on the right-hand page shown in Fig. 1 the rating given to D. H. Roe by Bradstreet is three thousand dollars, by Dun three thousand dollars, and by the International Business Agency four thousand dollars, while the credit limit is set down as three hundred dollars. In column H it is found that this customer is allowed sixty days in which to pay, and the ledger-folio (column I) is given as "77."

In case the party in charge of the book, or other authorized person, desires more information relative to a certain customer than is given in the credit-column the party refers to the customer's number in the column C, and thereby obtains the number of the credit-card in the cabinet, which credit-card can then be consulted, thus enabling the party in charge to obtain the whole business history of the customer.

Each leaf A is also provided with a column

F, giving the customer's business. Another column G contains the address. A column H gives the terms of sales. A column I is for the ledger-folio of the customer's account, and a column J is for containing miscellaneous information.

The cover E is preferably in the form of a strip of paper hingedly connected at one side to the leaf A adjacent to one side of the credit-column D to form a permanent part of the leaf A.

I do not limit myself to the particular construction shown and described for arranging the cover E in the book, as the same may be varied without deviating from the spirit of my invention. I prefer to have the leaves arranged in book form; but they may also be kept individually, if desired.

Having thus described my invention, I claim as new and desire to secure by Letters Patent—

A credit-book provided with leaves, each having a name-column containing the names of the customers, a credit-column appropriately designated for containing credit information opposite the names of the customers, and a cover for covering the credit-column, the cover being in the form of a flap hinged at one side to the page of the book adjacent to one side of the credit-column, as set forth.

In testimony whereof I have signed my name to this specification in the presence of two subscribing witnesses.

THOMAS G. KNIGHT.

Witnesses:
  JOSEPH H. INMAN,
  JOSEPH H. LYNCH.